UNITED STATES PATENT OFFICE.

JEAN LE DOYEN, OF PARIS, FRANCE.

IMPROVEMENT IN DISINFECTING COMPOUNDS.

Specification forming part of Letters Patent No. 5,403, dated December 24, 1847.

*To all whom it may concern:*

Be it known that I, JEAN LE DOYEN, of the city of Paris, in the Kingdom of France, have discovered a new and important liquid preparation or composition for disinfecting and for other purposes, called "Le Doyen's Disinfecting Fluid," which is described as follows:

The nature of my discovery consists in the application of a liquid composed of nitric acid and ceruse or carbonate of lead and water to the purposes of disinfection, &c.

*Composition or preparation.*—Take nitric acid in such quantity as may be desired, to which add four times its quantity of pure water. Then add to the above, in small quantities, carbonate of lead or ceruse. When the effervescence produced by the above preparation or composition shall have nearly ceased, continue to add the same carbonate of lead in small portions until there shall be no more effervescence. When the liquid shall have become clear on its surface there must be added the necessary quantity of pure water to cause the disinfecting-fluid to have about 14° of density of *l'aréomètre de Baumé*. The fluid is then in a fit state to be employed for disinfecting purposes in general, for curing sores, gangrene, and other diseased parts, for removing bad odors from bilge-water, and for other purposes.

The methods of applying the fluid are various and depend upon the nature of the substance or places to be disinfected and the kinds of diseases to be cured. If it is desired to destroy the bad odor that usually rises from a privy or *fosse d'aisance* or *lieux d'aisance*, there must be applied from one to two pounds of the disinfecting-fluid, in small quantities, to the exterior of the *fosse*. This operation must be renewed every time the odor becomes offensive, the quantity of disinfecting-fluid applied being variable, according to the quantity and temperature of the matter in the *fosse*. When it becomes necessary to empty the *fosse* there must be poured over the surface a quantity of the disinfecting-fluid, which must be stirred and mixed with the matter in the *fosse*. Then sprinkle with a gardener's watering-pot or other article over the surface of the substance and on the inside of the walls a sufficient quantity of the fluid, when the bad odor will disappear.

Generally one pound to a pound and a half of the disinfecting-fluid will be sufficient to disinfect about one hundred pounds of the matter in the *fosse* or other place, variable, however, according to the quantity of water mixed with the infected matter, requiring less fluid when there is much water mixed with the matters. In this state the matters can be removed and spread upon land for agricultural purposes without inconvenience to the operator arising from disagreeable odors, as this will all be removed by the application of the liquid.

In the wards of hospitals, in chambers for the sick, and in other places the operator should apply about a table-spoonful of the fluid to each chamber-vessel or *pot de chambre*, and cloths wet with the fluid should be applied in various parts and places of the building infected with impure air, which will remove bad smell; and this application must be repeated whenever the disagreeable odor reappears.

In applying the disinfecting-fluid to the cure of diseased bodies of persons, the assistance of a surgeon or physician is necessary generally, but may be dispensed with in many cases. When the sore or wound is much clogged with matter, and the subject is of an irritable nature, the fluid should be mixed with more water—say, one part of the fluid to four of water.

The fluid should be applied by means of cloths wet with the same and applied to the wound, and kept constantly wet with said fluid. The strength of the aforesaid fluid should be reduced by the addition of water according to the nature of the diseased part, reducing the strength of the fluid when the part affected is much irritated.

When there is no irritation the fluid may be used lukewarm at 14° of *l'aréomètre de Baumé* by means of a linen cloth soaked in the fluid. If the patient throws off much bad odor, place at a short distance from him, on each side, a linen cloth wet with the disinfecting-fluid. In gangrene the fluid may be applied in a cold state, and when thus applied it will not only disinfect the part or parts of disagreeable odor, but it will stop the progress of the gangrene and re-establish vitality in the affected limb or limbs. The use of this fluid entirely destroys offensive odors in the wards of jails or hospitals, whether these odors depend on the presence of feculent or of other secretions. The direct application of the fluid to offensive secretions immediately and completely destroys their smell.

The application of the fluid to sloughing sores and to mortified parts of patients in the several wards of the hospitals at once removes their *fœtor*, and thus greatly increases the comfort of the afflicted patients themselves and of other patients in the same wards. In some cases, when the fluid is applied to extensive and irritable sores, the effect is to change their action and to induce healthy granulations and cicatrization. The use of this fluid does not, like chloride of lime and other so-called disinfecting agents, leave behind it any smell of its own. No ill effect is caused by the general or topical use of the fluid.

In applying the fluid to purify the decks and holds of infected vessels the desks and holds must be washed with the fluid, previously mixed with a quantity of water at 14° of *l'aréomètre de Baumé*, in the same manner that they are ordinarily washed with water. No salt-water should be used with the fluid. To destroy the disagreeable odor of bilge-water, add the fluid until the bad smell disappears.

During the summer season, when a place is becoming infected from any cause—say an anatomical ward or place for dead bodies in a state of putrefaction—spread the disinfecting-fluid by means of cloths wet with the fluid or by other means until the place becomes completely disinfected. The fluid may be used as a sanitary remedy in various ways beside those above named.

The chemical action of the before described fluid is described as follows: The gas upon which the odors of putrefying substances chiefly depend is sulphureted hydrogen. This gas is evolved during the putrefaction both of vegetable and animal matter, but more copiously from the latter. It is this gas especially which gives its peculiar *fœtor* to night-soil. The strong and pungent smell which is so constantly experienced whenever night-soil is accumulated in considerable masses is due to ammonia. Sulphureted-hydrogen gas is among the most deadly of the poisonous gases. It is capable, when concentrated, of producing instant death, and must be capable of producing disease even when largely diluted with air. We know from experience that it does so; we detect its presence in dwelling-houses by its odor; we see its influence in the slowly-poisoned blood of the inhabitants; we trace its remotest consequences in the fevers and choleras that follow, and we learn the result in the mortuary record. Few understand what a cesspool really is; few have seen from every point of the surface of its contents this poisonous gas bubbling up as if in strong ebullition; few could tolerate it if a single hour after they had once been shown by the evidence of their senses what they are constantly breathing night and day.

The action of the before-described preparation is to decompose sulphureted hydrogen, and hence its power, immediately and completely to remove all the odor that depends upon this gas, under whatever circumstances evolved, when applied to night-soil. Thus the volatile ammonia is fixed and preserved in the soil, being in this way rendered incapable of escaping, the *fœtor* and pungency of the soil are at once destroyed, a substance (sulphureted hydrogen) poisonous alike to vegetable and animal life is removed from it, and a new substance (nitrate of ammonia) in the highest degree nutritive to the plant is added.

This disinfecting-fluid removes the *fœtor* of putrefying substances, vegetable and animal, by decomposing the sulphureted hydrogen, upon which that *fœtor* chiefly depends. It is capable of preventing the disengagement of sulphureted hydrogen in sick chambers and in the wards of hospitals, and of removing it in a few minutes when it is present, not merely by dissipating the smells, but by destroying the poison.

In regard to the application of this liquid as a dressing to putrescent sores, there can be no doubt that it will be found useful and that it possesses several advantages over those in common use, among others, that it is itself inodorous, that it corrects the fetid exhalations arising from sores, and that it eliminates one of the most excellent applications to gangrenous sores yet known. The most astonishing cures have been effected by the application of this liquid to cases of gangrene and putrid sores. In regard to the most important application of the disinfecting-fluid to the removal of the fetid and offensive odors arising from privies, cesspools, night-soil, &c., it will appear from what has been already stated that so far as the offensive effluvia result from sulphureted hydrogen and hydro-sulphate of ammonia this liquid will totally remove them.

Two important advantages will be attained by the use of this liquid in respect to the subsequent use of the night-soil as manure—the one, the conversion of a prejudicial and poisonous ammoniacal salt—viz., the hydro-sulphate of ammonia—into an inodorous and highly fertilizing compound—viz., the nitrate of ammonia. The other advantage is, by removing that poisonous and injurious compound, thereby saving the long and offensive exposure of the night-soil to the air which would be otherwise necessary, and which is not only disagreeable, but, by the consequent loss resulting from the volatility of the ammoniacal salts, is also injurious. By decomposing the sulphureted hydrogen it removes from night-soil the poison which renders such matters injurious to health and dangerous to life, and by charging the ammonia from a volatile into a fixed substance, and thereby preventing its escape and loss, it preserves in the night-soil the principle which renders it chiefly valuable as a manure, while it presents that principle to the plant in a form which is known to be highly beneficial to vegetation.

What I claim as my discovery, and desire to secure by Letters Patent, is—

The use of the before-described preparation or composition for disinfecting animal substances and other matters, fetid gases, and impure places.

JEAN LE DOYEN.

Witnesses:
 WM. P. ELLIOT,
 PETER POULIN.